Jan. 1, 1957   F. H. BUNNELL ET AL   2,775,978
SAFETY VALVE
Filed Jan. 2, 1953
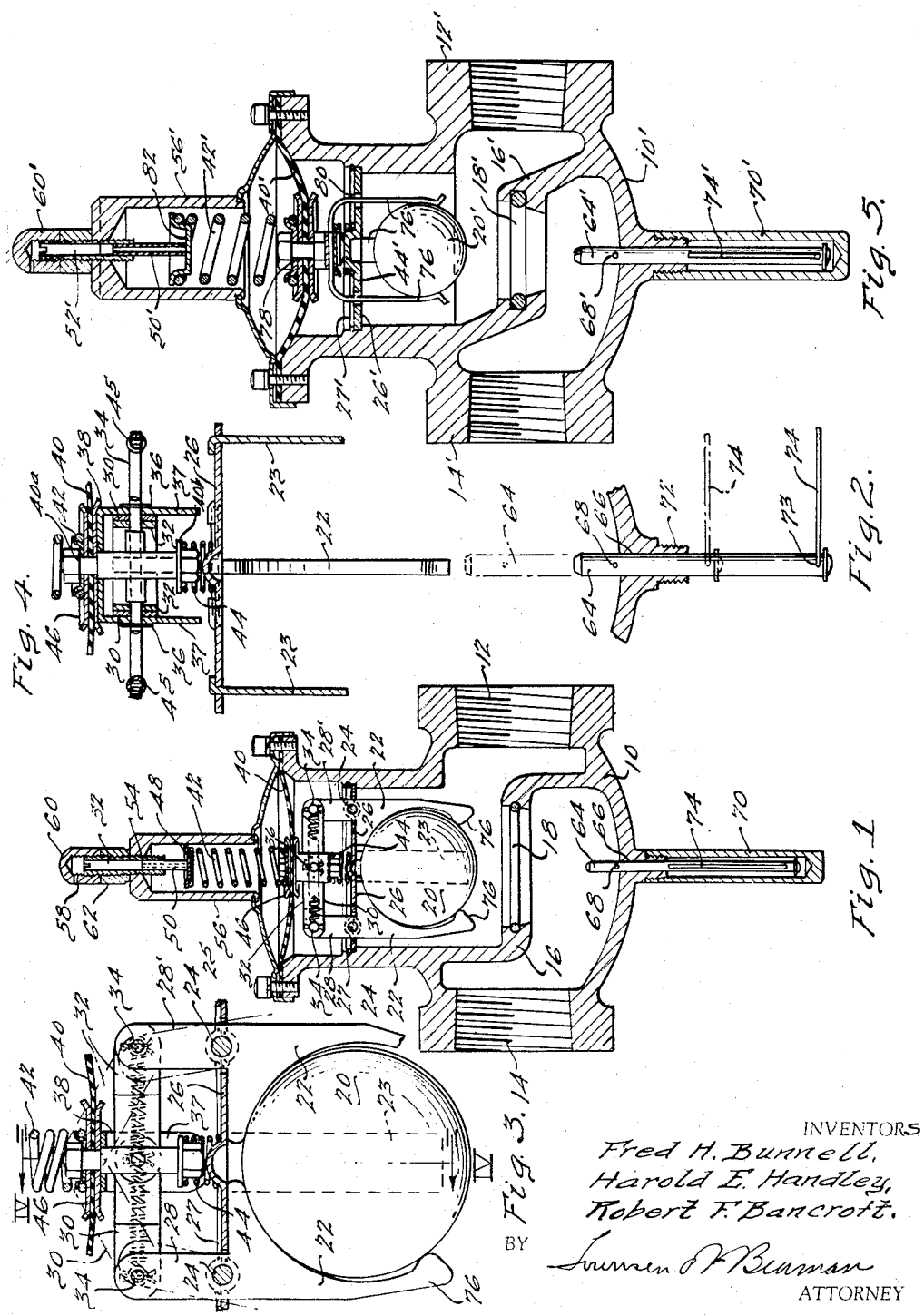
INVENTORS
Fred H. Bunnell,
Harold E. Handley,
Robert F. Bancroft.
BY
ATTORNEY

United States Patent Office 2,775,978
Patented Jan. 1, 1957

2,775,978
SAFETY VALVE

Fred H. Bunnell, Harold E. Handley, and Robert F. Bancroft, Jackson, Mich., assignors to Handley Brown Heater Company, Jackson, Mich., a corporation of Michigan Application January 2, 1953, Serial No. 329,330

6 Claims. (Cl. 137—80)

The present invention relates to improvements in automatic safety shut-off valves especially designed to be installed upstream from a gas meter to provide protection against excessive pressure and temperature conditions.

Safety shut-off valves for gas services are well known for shunting off the flow of gas or other fluid under abnormal conditions of pressure and temperature. The present invention is considered to be an improvement over known constructions which have appeared upon the market or may be found in the patented art. As in the case of prior art safety valves, the present invention, while particularly well adapted to the protection of gas service lines, is equally adaptable to the protection of all forms of fluid conduits where the interruption of fluid flow under excessive pressure and/or temperature conditions is desirable.

Thus an object of the invention is to provide an improved automatic shut-off valve characterized by the positive release of the valve element.

Another object is to provide an automatic shut-off valve which is incapable of being rendered inoperative due to corrosion and infrequent operation over long periods of service.

Another object is to provide an improved safety shut-off valve in which a gravity actuated valve element is released through a diaphragm movement.

Another object is to provide an improved temperature fused shut-off valve.

A further object is to provide an improved shut-off valve which may be readily tested in service and then reset with assurance that the valve is in proper operating condition.

These and other objects and advantages residing in the specific details of construction and the combination and arrangement of parts will more fully appear from the following specification and the appended claims.

In the drawings,

Fig. 1 is a vertical cross-sectional view of one form of the invention,

Fig. 2 is a fragmentary enlargement of a portion of Fig. 1 showing the reset rod, Fig. 3 is a fragmentary enlargement of the valve release mechanism of Fig. 1, Fig. 4 is a fragmentary vertical section taken on line IV—IV of Fig. 3, and Fig. 5 is a view similar to Fig. 1 of another form of the invention.

In the form of the invention shown in Fig. 1, the cast body 10 of the valve has conventional threaded connections 12 and 14 to receive the threaded ends of pipe sections carrying the gas or other fluid. The valve seat structure 16 is shown with an inserted resilient ring 18 of suitable material to constitute the seating surface for the valve element. "Neoprene" is the only material from which the ring 18 may be fabricated with advantage.

The valve element is preferably in the form of a ball 20 of relatively heavy non-corrosive material which will fall by gravity to engage the ring 18 and effectively seal off the fluid pressure flow between the inlet and outlet connections 12 and 14. Obviously, the fluid pressure will aid in holding the ball valve 20 it its seat 18.

Under normal operating conditions the ball valve 20 is supported by a pair of arms 22 and steadied by a pair of vertical members 23 located on each side of the ball 20. The arms 22 are carried on pivot pins 24 supported across slots 25 in the plate 26. A snap ring 27 holds the plate 26 in position. Portions 28 and 28' of the arms 22 extend above the plate 26 to pivotally connect with pairs of forked arms 30 and 32 through pivot pins 34. At their inner ends the pairs of arms 30 and 32 are pivotally connected to pins 36 carried on the depending legs 37 of the inverted U-bracket 38.

The diaphragm 40 has fixed thereto at its center a double ended shoulder bolt 40a having a shoulder 40b which has a limited amount of axial floating lost motion with respect to the ends of the pins 36. A relatively heavy spring 42 acts downwardly upon the diaphragm 40 and bolt 40a while a relatively light spring 44 acts upwardly on the shoulder 40b.

To provide added stability to the assembly supporting the ball 20, the pins 34 are extended on opposite sides of the pivotal connections with the pairs of arms 30 and 32 to receive the ends of tension springs 45 which tend to draw the upper ends 28 and 28' of the arms 22 inwardly to urge the pivot pins 36 into a slightly below center position determined by the engagement by the arms 36 of the bracket 38 with the plate 26. Thus, the arms 22 do not actually grip the ball 20 but merely provide a cradle in which it is supported.

Resisting the fluid pressure upon the diaphragm 40 is the spring 42 which abuts the seat 46 at one end and the adjustable seat 48 at its upper end. Preferably, the seat 48 is carried on a hollow fusible rod 50 fixed in a hollow adjustment screw 52 threaded into the wall at 54 of the housing 56. The area above the diaphragm 40 is vented through the opening 58 in the cap 60. Lock nuts 62 maintain the adjustment of the screw 52.

The structure for resetting the ball valve into the position shown in Fig. 1 comprises a reset rod freely slidable in the bore 66. A cross pin 68 prevents the rod 64 from falling out when the sealing cap 70 is unscrewed from the threaded boss 72. A safety wire 74 in the form of a hair pin is hinged in the hole 73 at the lower end of the rod 64 with the leg portions normally disposed parallel to the axis of the rod 64. Before the rod 64 may be elevated to engage and lift the ball 20 from the seat ring 18, the wire 74 must be hinged downwardly as shown in Fig. 2. After the ball valve 20 has been lifted from the seat 16 and reset within the arms 22, to apply the cap 70, the rod 64 must be fully lowered and the legs of the wire 74 brought into parallelism with the axis of the rod 64 as shown in Fig. 1. This arrangement avoids any possibility of the rod 64 being left elevated after resetting the ball valve 20.

At the time the ball valve 20 is raised by the rod 64 to reset the valve, the surfaces 76 are engaged by the ball 20 to cam the arms 22 outwardly to admit the ball 20 therebetween. However, before the arms 22 are capable of being outwardly cammed sufficiently to receive the ball valve 20 it is necessary to elevate the pins 36 from their below center position to an above center position to permit the arms 28 and 28' to move toward the dotted line position shown in Fig. 3. This may be accomplished by reducing the tension on the spring 44 through adjustment of the screw 52 sufficiently to permit the spring 42 to function to raise the bolt 40a to bring the shoulder 40b into contact with the pins 36 to thereafter lift the pins 36 along with the bracket 38; it being understood that the bolt 40a and the center of the diaphragm move as a unit relative to the bracket 38 and its associated structure until the shoulder 40b travels the limited distance best shown in Fig. 4 and engages the pins 36. With the ball 20 supported by the rod 64 within the arms 22, the screw 52 is returned to its normal position and the tension of the spring 42 will overcome the spring 44 to lower the diaphragm 40 and bracket 38 from the dotted to the full line position of Fig. 3. In this position the pins 36 are slightly below center and will be held in this position by the tension springs 45 until the pins 36 are raised by the shoulder 40b. The rod 64 may now be lowered and the cap 70 applied as heretofore described.

Upon excessive fluid pressure the diaphragm 40 is raised against the tension of the spring 42, the bolt 40a and shoulder 40b moving with the diaphragm 40 as a unit and actuating the bracket 38 after a slight upward travel to overcome the lost motion connection between the pins 36 and the shoulder 40b. The ball valve 20 is thus released to fall by gravity to its seat upon the ring 18.

Upon excessive temperature conditions, the fusible member 50 will either melt or be released to slide upwardly in the bore of the screw 52. In either event the tension on the spring 42 will be released and the spring 44 will move the bolt 40a upwardly to actuate the bracket 38 and release the ball valve 20 to fall by gravity to its seat upon the ring 18.

Referring to the form of the invention shown in Fig. 5, parts corresponding to the form of Fig. 1 are designated by corresponding prime reference characters and such parts have the same function as described with reference to the first form.

As shown in Fig. 5, in lieu of the pivoted arms 22 of Fig. 1, the ball valve 20′ is supported by spring metal arms 76 which grip the ball 20′ to hold it in suspension over the seat 18′. A bolt 78 connects the arms 76 to the diaphragm 40′. It will be noted that the arms 76 extend through openings 80 in the plate 26′ which acts as a stripper plate to eject the ball valve 20′ from the arms 76 at the time excessive pressure raises the diaphragm 40′ against the pressure of the spring 42′.

Upon excess temperature conditions the fusible hollow rod 50′ will permit the spring 42′ to lose its tension in which event the spring 44′ will raise the arms 76 to strip the ball valve 20′ therefrom so it may drop by gravity to its seat 18′.

To reset the ball valve 20′ within the arms 76 the cap 60′ is removed and a wire (not shown) is passed through the hollow screw 52′ and hollow fuse 50′ to engage the spring seat 82 to lower the same compressing the spring 42′ more than shown in Fig. 5. This added resistance to upward movement is required in order to resist the upward thrust on the ball valve 20′ by the rod 64′ required to spring the ball valve 20′ within the arms 76 which are four in number and being of spring metal offer considerable resistance to being sprung outwardly to pass over the diameter of the ball 20′ into the position shown in Fig. 5.

We claim:

1. In an automatic fluid flow control valve comprising a valve casing containing a valve seat and a valve element releasable to seat against the valve seat upon the occurrence of excessive pressure or temperature, means operable to set said valve member in position for release, said means including a reset element, means mounting said re-set element on the valve casing for actuation from an initial position so as to cause the valve element to be moved off its valve seat into the release position, closure means for normally enclosing said re-set element upon the valve casing, and safety means cooperable between the re-set element and the said closure member to preclude application of said closure member unless said re-set element is in said initial position in which it has no influence upon the position of said valve element.

2. A valve assembly as claimed in claim 1, said reset element comprising an elongated rod slidably mounted upon the valve casing for projection into the casing to contact the said valve element and lift said valve element off its seat, said re-set rod being normally in retracted position in which it is held clear of the valve element, said safety means comprising an elongated pin element movably mounted on said re-set rod so as to be positioned against the valve casing to hold the re-set rod against inward projection unless moved away from said position, said closure member comprising an elongated cap engageable over the said re-set rod when in retracted position, but being incapable of being so engaged unless the said pin element is positioned against the valve casing.

3. A valve assembly as claimed in claim 1, said reset element comprising an elongated rod slidably mounted upon the valve casing for projection into the casing interior to engage the said valve element and dislodge the valve element from its seat, and said safety means comprising a hair-pin element pivotally mounted at its closed end upon the outer end of said rod and having its legs arranged to extend along the rod, when in retracted position, with their free ends engaged against the valve casing so as thereby to prevent inward projection of the rod, said closure member being only capable of application over the said rod when the free ends of said hair-pin element are engaged against the valve casing.

4. In an automatic valve assembly in which a valve element is automatically released to move to closed position with respect to a valve seat within a valve casing upon the occurrence of excessive fluid pressure, cradle structure within said casing for holding the said valve element in open position with respect to said valve seat, a diaphragm within said casing and actuatable by the fluid pressure, means connecting said cradle structure with said diaphragm for actuation to release said valve element, spring means resisting movement of said diaphragm and stripper means in said casing cooperable with said cradle structure to actuate the cradle structure to release said valve element to move to closed position upon the said spring means being overcome due to excessive fluid pressure.

5. In an automatic valve in which a relatively heavy ball valve is released to fall to closed position against a valve seat within the valve casing upon the occurrence of excessive pressure or temperature, cradle structure engageable with said ball valve to releasably hold the ball valve in raised position with respect to said seat, a diaphragm mounted in said casing in position to be subjected to the prevailing fluid pressure, means connecting said cradle structure with said diaphragm for actuation against said spring to release the ball valve to fall to its said seat upon the occurrence of excessive pressure, re-set means on said casing for re-setting said ball valve in raised position upon said cradle structure, closure means normally enclosing said re-set means on said casing, and safety means cooperable between said re-set means and said closure means to prevent application of said closure means unless said re-set means is in initial position in which the re-set means is held clear of the ball valve.

6. In an automatic fluid flow control valve in which a valve element is automatically released to move from open to closed position upon the occurrence of excessive pressure or temperature, the combination with casing structure, including a seat for said valve element, of cradle structure, for supporting said valve element in open position within the valve casing, a diaphragm in said valve casing actuatable by the fluid pressure therein, means connecting said cradle structure with said diaphragm for actuating said cradle structure to release said valve element to move into closed position against said seat upon the occurrence of excessive fluid pressure, spring means resisting fluid pressure upon said diaphragm and fusible means operatively connected with said spring means to automatically overcome said resistance upon the occurrence of excessive temperature and thereby free the cradle structure to release said valve element to move to closed position, and means normally dominated by said first spring means to move said cradle into its releasing position when said excessive temperature occurs.

References Cited in the file of this patent

UNITED STATES PATENTS

| | | |
|---|---|---|
| 1,093,899 | Waddell | Apr. 21, 1914 |
| 2,379,124 | Wasson | June 26, 1945 |
| 2,387,792 | Holmes | Oct. 30, 1945 |
| 2,635,626 | Meynig | Apr. 21, 1953 |

FOREIGN PATENTS

| | | |
|---|---|---|
| 622,332 | Germany | Nov. 26, 1935 |